(12) United States Patent
Grinberg et al.

(10) Patent No.: US 6,441,368 B1
(45) Date of Patent: Aug. 27, 2002

(54) INFRARED/VISIBLE ENERGY PROTECTION FOR MILLIMETER WAVE BOLOMETER ANTENNA METHOD AND APPARATUS

(75) Inventors: Jan Grinberg, Los Angeles; Michael D. Jack, Goleta, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/000,591

(22) Filed: Oct. 23, 2001

Related U.S. Application Data
(60) Provisional application No. 60/252,150, filed on Nov. 17, 2000.

(51) Int. Cl.[7] .............................. H01J 5/02; H01J 40/14
(52) U.S. Cl. ........................ 250/239; 250/214; 250/216
(58) Field of Search ................................. 280/332, 330, 280/336.1, 338.1, 239, 214.1, 216

(56) References Cited

U.S. PATENT DOCUMENTS
6,329,655 B1 * 12/2001 Jack et al. ............... 250/338.1

* cited by examiner

*Primary Examiner*—Hung Xuan Dang
(74) *Attorney, Agent, or Firm*—William C. Schubert; Glenn H. Lenzen, Jr.

(57) ABSTRACT

A method and apparatus for protecting a bolometer antenna imaging array from out of band electromagnetic energy is disclosed. Protective pads are disposed upon a window in an optical system forming a millimeter wave image on an array of bolometer antenna sensors. The protective pads are effectively opaque to infrared and visible emissions and are aligned to shade the bolometer portion of the bolometer antennas from infrared and visible emissions, while leaving the antenna portion of each sensor in the array exposed to intercept the millimeter wave energy incident upon them.

23 Claims, 2 Drawing Sheets

FIG. 4
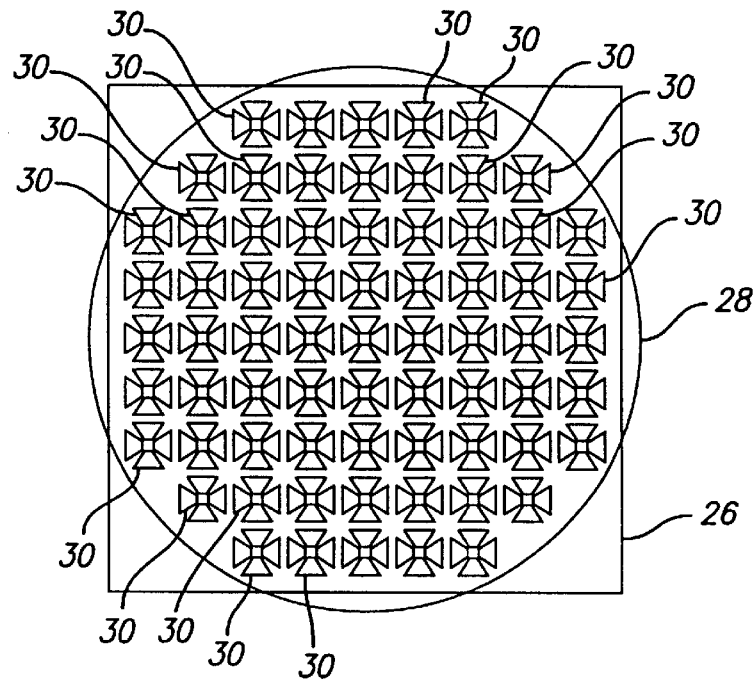
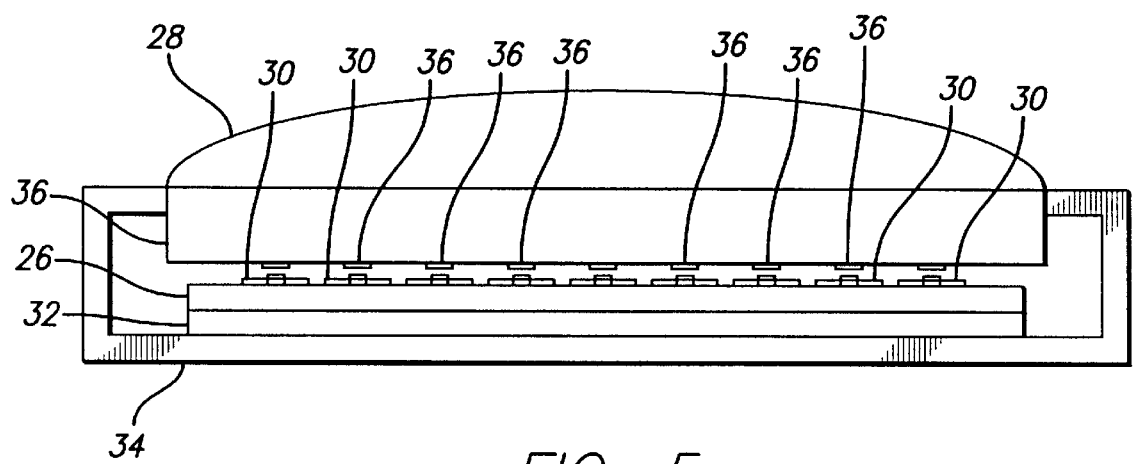
FIG. 5

INFRARED/VISIBLE ENERGY PROTECTION FOR MILLIMETER WAVE BOLOMETER ANTENNA METHOD AND APPARATUS

This application claims the benefit of provisional application No. 60/252,150 filed Nov. 17, 2000.

BACKGROUND OF THE INVENTION

1. Field of the Invention

The present invention relates to electromagnetic wave sensors. More specifically, the present invention relates to systems and methods for protecting millimeter wave imaging arrays from infrared and visible light emissions.

2. Description of the Related Art

Millimeter wave (MMW) frequency bands lie in the range from approximately 30 GHz to over one terahertz. This band of frequencies is of particular interest in imaging applications because atmospheric 'windows' exists through which certain bands of MMW frequencies pass with low attenuation. In particular, the bands near 95 GHz, 140 GHz, 220 GHz, and 330 GHz exhibit low attenuation characteristics even in the presence of air, clouds, fog, rain, and other precipitation. This affords an option for imaging where other frequencies, such as visible spectrum and infrared, are attenuated to such a severe degree that imaging is not practicable. Applications in aerospace, military and commercial exists which gain significant advantage through the use of MMW imaging.

The technology to image in the MMW band is well developed. For example, the assignee of the present invention has developed MMW imaging technology as demonstrated in co-pending U.S. patent application Ser. No. 09/414,988, filed Oct. 07, 1999, by J. Grinberg et al. and entitled MM-WAVE/IR MONOLITHICALLY INTEGRATED FOCAL PLANE ARRAY, the teachings of which are hereby incorporated by reference.

Current MMW imaging technology typically employs an array of broadband MMW antennas that lie in a focal plane array. A lens and/or reflector system is employed to gather MMW energy over a large aperture and focus the energy onto the array of antenna elements. By analyzing the energy incident upon each element of the array, an image can be generated such that each antenna in the array is a pixel in the image. While there are a number of methods to receive and detect MMW energy, an antenna design which utilizes a bolometer to sense antenna current, and therefor incident signal strength, has been found to be efficient and effective in detecting MMW energy.

Briefly, the antenna current is passed through a low resistance material which fluctuates in temperature in response to current flow therethrough. There are a number of thermal considerations in such a design, however, the technology has developed to the point where sensitive imaging performance can be achieved. The heat from the low resistance material is thermally coupled to the bolometer element. A voltage is applied across the bolometer element and the current flowing there through is measured. Since this current flow is proportional to the heat generated, and the heat generated is proportional to the incident MMW energy, the current through the bolometer is proportional to the incident MMW energy. By sensing the current flow in all of the elements in the array, an image can be created.

One disadvantage of this present MMW imaging technology is that bolometers are sensitive to any source of heat. While there are a number of thermal considerations in the foregoing design to control the affects of other heat sources, such as thermal isolation and thermal stabilization, some sources of heat energy are not readily controllable. In fact, bolometers are frequently used to detect incident infrared energy. It is therefore difficult for a MMW bolometer antenna array sensor to discriminate between MMW energy and infrared energy. The same is true for visible energy as well. Since this limitation is generally known by those skilled in the art, an entity desiring to prevent imaging through use of MMW radiation can effect countermeasures to prevent effective imaging. For example, a powerful infrared source, directed at the aperture of the current technology MMW imaging sensor can effectively 'blind' the sensor from forming images. In fact, if the energy source is powerful enough, the heat rise in the bolometer elements may be so great so as to destroy the sensor.

While band pass and notch filters are available to mitigate the foregoing affects, none are effective against such a direct countermeasure. Similarly, in environments with high levels of infrared or visible energy, the MMW reception capability of such an array may be compromised.

Thus there is a need in the art for a method and apparatus for protecting MMW sensors from out of band emissions originating naturally or produced as a countermeasure to effective MMW imaging.

SUMMARY OF THE INVENTION

The need in the art is addressed by the apparatus and methods of the present invention. In one illustrative embodiment, the invention is implemented as a sensor having a housing with an antenna. The antenna has a bolometer portion and the housing has a window positioned adjacent to the antenna. A protective pad is coupled to the window and is aligned with the bolometer. The surface area of the protective pad may be substantially the same as the surface area of the bolometer. The protective pad may be formed from metal.

In another illustrative embodiment, the sensor is a millimeter wave sensor and the protective pad functions to block infrared and visible light, and the pad is formed of metal to a thickness that appears opaque in the infrared band. The pad thickness is in the range of 500 to 2000 angstroms. In a refinement, the pad thickness is approximately 2000 angstroms. In another illustrative embodiment, a plurality of antennas form a focal plane array supported within the housing and a plurality of protective pads are coupled to the window. The pads are aligned with the bolometers in the antennas, so that each of the bolometers is protected.

The present invention provides a method for protecting a sensor from infrared and visible radiation. The method is adapted for use with a sensor disposed in a housing with a window and an antenna supported therein. The antenna is located adjacent to the window and has a bolometer. The method comprises the step of forming a protective pad on a surface of the window at a position located adjacent to the bolometer. In a refinement of this method, the surface area of the protective pad is substantially the same as the surface area of the bolometer. In a further refinement, the protective pad is metal. In a further refinement, the sensor is a millimeter wave sensor and the protective pad functions to block infrared and visible light. The pad is formed of metal to a thickness that appears substantially opaque in the infrared band. In a further refinement, the pad thickness is in the range of 500 to 2000 angstroms. In a further refinement, the pad thickness is approximately 2000 angstroms.

BRIEF DESCRIPTION OF THE DRAWINGS

FIG. 4 is a view of a focal plane array of millimeter wave bolometer antennas in an illustrative embodiment of the present invention.

FIG. 5 is a section view of a focal plane array of millimeter wave bolometer antennas in an illustrative embodiment of the present invention.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An illustrative embodiment of the present invention is a millimeter wave (MMW) imaging sensor that utilizes a focal plane array of MMW sensors to form an image of energy incident on the sensor in the MMW band. It is understood by those skilled in that art that windows of atmospheric transmission exist in the MMW band at approximately 95 GHz, 140 GHz, 220 GHz, and, 330 GHz, and, that there is useful information in the MMW band in the range from approximately 30 GHz well into the terahertz frequency range. It is also understood that a suitable sensor design is an antenna with a bolometer element used to measure the current flowing in the antenna. The antenna current is proportional to the amount of MMW energy circulating within the antenna element. A plurality of such antennas are laid out in a focal plane array, each forming a pixel of information in the image that is sensed. Because useful energy exists over a range of frequencies, a broadband antenna design is appropriate.

Figure 1:
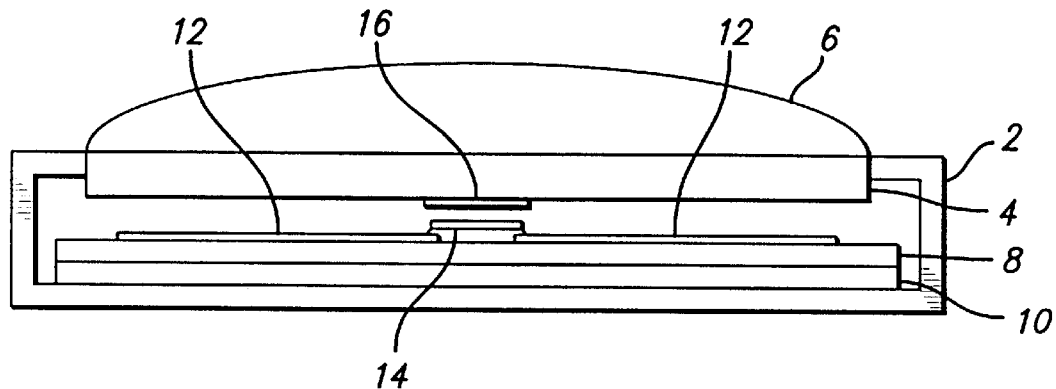
FIG. 1 is a section view of a millimeter wave bolometer antenna sensor in an illustrative embodiment of the present invention.

Reference is directed to FIG. 1, which is a section view of a single element bolometer antenna sensor in an illustrative embodiment of the present invention. A housing 2 has a window 4 formed in one of its surfaces. The window 4 is fabricated from a material that is essentially transparent in the MMW band of interest such that MMW energy can be transmitted into the housing 2. The interior of the housing 2 is evacuated so as to create a vacuum. As will be discussed hereinafter, the evacuated environment is advantageous to enhance the sensitivity of the bolometer element. A silicon substrate 8 is coupled to the housing 2 via a thermoelectric cooling element 10. On the surface of the silicon substrate 8, facing the window 4, is a bow tie antenna element 12 which is shaped to be resonant within the MMW band of interest. A bow tie antenna configuration is appropriate due to its broad band characteristics, as is well understood by those skilled in the art.

The antenna 12 is resonant in the MMW band such that when energy in that band is incident upon the antenna 12, current flow proportional to the incident energy is induced within the antenna element 12. At the center of the antenna element 12 is a bolometer 14. As is understood in the art, and as will be more fully discussed hereinafter, a bolometer is a device that is used to measure the flow of current proportional to the temperature of the bolometer. In the preferred embodiment, the bolometer 14 has an additional layer of nickel-chromium alloy (hereinafter "nichrome") disposed upon its surface. Antenna currents flow through the nichrome which cause it to heat and cool proportional to the current flow. The bolometer element has a voltage applied to it and the current flow through it is measured, and thus the bolometer measures the fluctuations in temperature, because the current measurement is proportional to the energy incident upon the antenna element. When a plurality of sensors are arranged in a focal plane array, the individual sensors become pixels of an image that is based on the current flows resulting from the energy incident of the various sensors.

The bolometer 14 is supported above the silicon substrate 8 so as to thermally isolate the bolometer from the other components within the housing 2. In addition, the housing 2 is evacuated to further thermally isolate the bolometer 14 from its environment. These isolating efforts result in greater sensitivity of the bolometer 14 due to its very low thermal inertia and controlled thermal coupling though conduction and convection. The interior of the housing 2 is thermally stabilized by use of thermoelectric cooler 10. The thermoelectric cooler 10 couples heat from the interior of the housing 2 to its exterior, thereby preventing heat build up, and generally stabilizing the thermal environment of bolometer 14.

A lens 6 is used to focus and direct MMW energy onto the sensor, or plurality of sensors. This function is directly analogous to the use of lenses in the infrared and visible wave spectra in optical systems in that the lens creates an image of a distant field of view upon the focal plane of the sensor. In this FIG. 1, a single plano-convex lens 6 attached directly to window 4 is show by way of example only. As will be understood by those skilled in the art, more complex lens assemblies utilizing both refractive and reflective elements may be employed to increase system performance. These elements may be cemented or air spaced. In addition, it may be desirable to utilize spectral band-pass or notch filters to pass and block certain bands of interest for the particular application.

As was discussed earlier, a problem inherent in the design of a MMW sensor utilizing a bolometer to measure signal strength is that anything that affects the bolometer temperature is a source of noise, signal degradation and could potentially be destructive to the device. In particular, sources of infrared radiation are particularly problematic not only because they occur naturally, but also because they are frequently used as a source of countermeasure jamming in tactical operations. The present invention eliminates this problem to a great degree by blocking and reflecting such infrared and visible energy. This is accomplished by placing a protective pad, which may be fabricated from metal, between such energy source and the highly sensitive bolometer, which protective pad is illustrated as item 16 in FIG. 1. The antenna elements are left exposed to receive radiation needed to make the desired measurements while still protecting the sensitive bolometer element. As will be discussed more fully hereinafter, the physical arrangement and structure are selected to provide optimum protection of the bolometer without degrading performance of the sensor as a whole.

Figure 2:
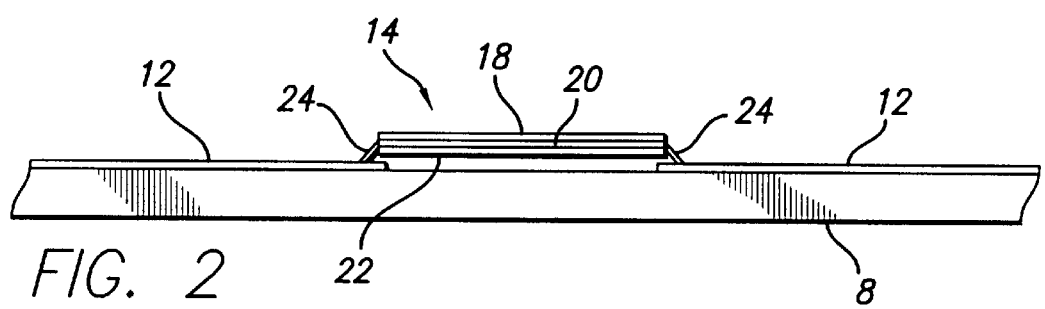
FIG. 2 is a detail of the bolometer structure in an illustrative embodiment of the present invention.

Reference is directed to FIG. 2, which is a detail of a bolometer 14 used in an illustrative embodiment of the present invention. A portion of the silicon substrate 8 is shown in this view along with a portion of bow tie antenna elements 12. The bolometer 14 comprises three essential layers 18, 20, and 22. Layer 20 is an insulating nitride layer that serves to electrically insulate the other two layers from one another and also couples to supports 24 which suspend the bolometer over the silicon substrate 8. Again, this serves to thermally isolate the bolometer from the substrate 8. Bolometer layer 18 is the nichrome layer which is characterized by its relatively low resistively, in the order of 100 ohms per square. Layer 22 is the bolometer layer which is formed from vanadium oxide. This material is characterized by relative high resistively on the order of 20 to 100 kiloohms per square, and by the predictable dependence of this resistivity on temperature.

In operation, MMW energy incident on the antenna elements 12 induces current flow within the antenna that is proportional to the quantum of incident energy. This current flow is electromagnetically and capacitively coupled to bolometer 14 since the bolometer 14 is positioned at the center of antenna 12, where current flows are at a maximum. The physical dimensions of bolometer 14 are selected to accomplish an efficient impedance match between free space, the antenna and the bolometer element, as is understood by those skilled in the art. Since the resistivity of nichrome layer 18 is much lower than the resistivity of the vanadium oxide layer 22, the majority of antenna current couples to the nichrome layer 18. The flow of current causes a proportional change in the temperature of the nichrome layer 18 which is thermally coupled to the vanadium oxide layer 22 through nitride layer 20. The fluctuation in resistivity of the vanadium oxide layer 22 causes a proportional fluctuation in the current flow though it, which is measure by other circuitry (not shown). Thus a measurement is made that is proportional to the MMW energy incident upon the antenna element 12.

Figure 3:
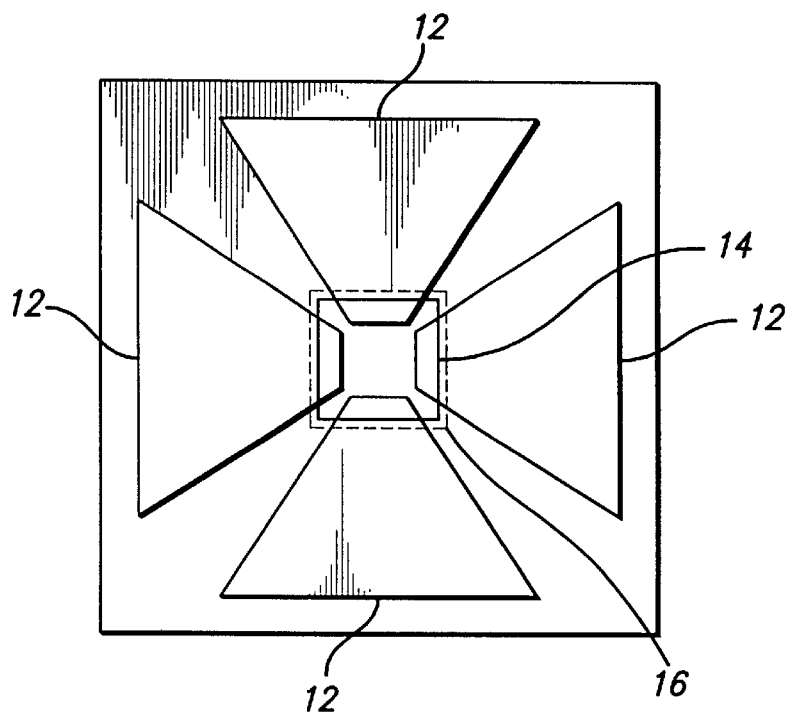
FIG. 3 is a view of a bow tie antenna with bolometer in an illustrative embodiment of the present invention.

Reference is directed to FIG. 3, which is a view of a bow tie antenna element 12 and bolometer 14 in an illustrative embodiment of the present invention. The bow tie antenna elements 12 are arranged to receive energy in the band of interest relatively efficiently whether they are horizontally, vertically, or circularly polarized. The bolometer element 14 is placed at the center of antenna 12 and spaced such that currents circulating in the antenna 12 efficiently coupled to bolometer 14. Note in FIG. 3 the orientation of the protective pad 16 (shown in phantom). Note that the protective pad is somewhat larger than the bolometer in this illustrative embodiment.

The physical parameters of the protective pad 16 and its relationship to the other elements of the sensor are important in the design. In an illustrative embodiment, the bolometer 14 is suspended above the silicon substrate and antenna elements 12 by approximately 0.2 to 0.5 microns. This spacing provides adequate thermal isolation while still providing efficient electromagnetic coupling of the antenna currents from the antenna elements 12 to the bolometer 14. When considering the relative size and position of the protective pad 16 and bolometer 14, it is necessary for the protective pad 16 to fully shield the bolometer 14 from energy propagating along a path perpendicular to the surface of the bolometer (hereinafter "on-axis radiation"). However, it is also necessary to consider radiation that is arriving off-axis or that is scattered within the sensor. While it is advantageous to place the protective pad as close as possible to the bolometer from the standpoint of protection from off-axis radiation, it is also necessary to place the protective pad far enough away from the bolometer so that antenna currents do not significantly couple to the protective pad. This is the case when the protective pad is fabricated from a conductive material. Since infrared radiation is the primary concern in this illustrative embodiment design, the spacing between the protective pad and bolometer is set at approximately 10 microns. This distance is a very small fraction of the wavelength of the MMW energy (which fall in the range of approximately 100 microns to 10 millimeters). The immersion effect, known to those skilled in the art, prevents the protective pad 16 from affecting the coupling of incident MMW energy to the antenna elements 12. The affect of the immersion effect is to render the apparent gap between the protective pad and the bolometer to be effectively zero from an electromagnetic point of view at the MMW frequencies of interest. On the other hand, on-axis infrared and visible emissions are effectively blocked. Since visible and infrared emissions have wavelengths in the 0.4 micron to 12 micron range, this energy can propagate within the gap between the protective pad 16 and the bolometer 14. This undesirable propagation can be controlled by restricting propagation at angles acute to the bolometer 14 surface through optical and mechanical vignetting of the energy pathways. It is also noted that strong sources of infrared energy, used as a countermeasure, are typically from distant sources which are on-axis or near-axis sources.

It is noted that visible spectrum and infrared energy are readily controllable and that very narrow beamwidths are achievable through the use of lasers. These narrow beams can be directed to the aperture of the MMW imaging sensor. On the other hand, MMW energy is not readily controllable in beamwidth. In fact, a very large physical structure is needed to generate a narrow enough beamwidth to be useful in counter measure applications. Because of this fact, the exposed bow tie antenna elements in the present invention are not likely targets of countermeasures.

The protective pad 16 in the illustrative embodiment is a metallic material with a thickness in the range from 500 Angstroms to 2000 Angstroms. By 2000 Angstroms of thickness, the protective pad 16 becomes effectively opaque to infrared and visible emissions. The protective pad is deposited to the inner surface of the window 4 and is aligned with the bolometer element using manufacturing techniques commonly employed, such as are used in liquid crystal display technology. Such procedures are well known by those skilled in the art.

The foregoing illustrative embodiment utilized a single sensor MMW bolometer antenna design. Since a primary application of the present invention is for imaging in the MMW band, a design employing a plurality of sensor elements in a focal plane array is preferred. Reference is directed to FIG. 4, which provides a view of an array of bolometer antenna sensors in an illustrative embodiment of the present teachings. A larger silicon substrate 26 supports a plurality of bolometer antenna elements 30. A suitable lens 28 is sized and positioned to direct and focus the desired MMW energy onto the array of bolometer antennas 30. The size of the array and number of elements is constrained by current technology and the wavelength of interest. Presently, arrays on the order of thousands of elements are practicable. It should be understood that the present invention is applicable to arrays of any size.

Reference is directed to FIG. 5, which is a section view of the array of bolometer antenna elements in FIG. 4. As with the single element approach, a housing 34 supports a thermoelectric cooler 32 which in turn supports a silicon substrate 26. Disposed on the silicon substrate is an array of bolometer bow tie antennas 30 of a design similar to that discussed herein before. The housing 34 includes a window 36 that is sized to expose the entire array 30. Disposed on the inside of window 36 is a plurality of protective pads 36 which are sized and positioned to be adjacent to the array of bolometers 30. The general requirements respecting size and materials are essentially the same as was discussed respecting the single element design.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. A sensor comprising:

a housing;

an antenna supported within said housing, said antenna further comprising a bolometer; and a protective pad aligned with said bolometer.

2. The sensor of claim 1 wherein the surface area of said protective pad is substantially the same as the surface area of said bolometer.

3. The sensor of claim 1 wherein said protective pad is metal.

4. The sensor of claim 1 wherein the sensor is a millimeter wave sensor and said protective pad functions to block infrared and visible light.

5. The sensor of claim 4 wherein said pad is formed of metal to a thickness that appears opaque in the infrared band.

6. The sensor of claim 4 wherein said pad thickness is in the range of 500 to 2000 angstroms.

7. The sensor of claim 4 wherein said pad thickness is approximately 2000 angstroms.

8. The sensor of claim 1 further comprising a window in said housing positioned adjacent to said antenna and wherein said pad is disposed upon said window.

9. The sensor of claim 1 further comprising:

a plurality of antennas forming a focal plane array supported within said housing;

a window in said housing positioned adjacent to said antenna and a plurality of protective pads coupled to said window, said plurality of protective pads aligned with a plurality of bolometers in said plurality of antennas.

10. An improved sensor, having a housing with a window and an antenna supported therein and located adjacent to the window, the antenna having a bolometer portion, the improvement comprising:

a protective pad aligned with the bolometer.

11. The sensor of claim 10 wherein the surface area of said protective pad is substantially the same as the surface area of said bolometer.

12. The sensor of claim 10 wherein said protective pad is metal.

13. The sensor of claim 10 wherein the sensor is a millimeter wave sensor and said protective pad functions to block infrared and visible light.

14. The sensor of claim 13 wherein said pad is formed of metal to a thickness that appears substantially opaque in the infrared band.

15. The sensor of claim 13 wherein said pad thickness is in the range of 500 to 2000 angstroms.

16. The sensor of claim 13 wherein said pad thickness is approximately 2000 angstroms.

17. The sensor of claim 10 wherein said pad is disposed upon the window.

18. A method of protecting a sensor from infrared and visible radiation, the sensor having a housing with a window and an antenna supported therein and located adjacent to the window, the antenna having a bolometer portion, comprising the steps of:

forming a protective pad on a surface of the window in a position located adjacent to the bolometer.

19. The method of claim 18 wherein the surface area of said protective pad is substantially the same as the surface area of said bolometer.

20. The method of claim 18 wherein said protective pad it metal.

21. The method of claim 18 wherein the sensor is a millimeter wave sensor and said protective pad functions to block infrared and visible light, and wherein:

said pad is formed of metal to a thickness that appears substantially opaque in the infrared band.

22. The method of claim 21 wherein said pad thickness is in the range of 500 to 2000 angstroms.

23. The method of claim 21 wherein said pad thickness is approximately 2000 angstroms.

* * * * *